United States Patent
Baxter et al.

(10) Patent No.: US 8,465,268 B2
(45) Date of Patent: Jun. 18, 2013

(54) COMPRESSION CLAMP FOR A MODULAR FLUID END FOR A MULTIPLEX PLUNGER PUMP

(75) Inventors: Winston Kirk Baxter, Alice, TX (US); Scott Allen Reeves, Alice, TX (US)

(73) Assignee: Phoinix Global LLC, Alice, TX (US)

( * ) Notice: Subject to any disclaimer, the term of this patent is extended or adjusted under 35 U.S.C. 154(b) by 243 days.

(21) Appl. No.: 12/879,066

(22) Filed: Sep. 10, 2010

(65) Prior Publication Data

US 2012/0063936 A1   Mar. 15, 2012

(51) Int. Cl.
  *F04B 19/00* (2006.01)
  *F01B 1/02* (2006.01)

(52) U.S. Cl.
  USPC ........... 417/437; 417/454; 417/515; 417/539; 92/169.1; 92/146

(58) Field of Classification Search
  USPC ................. 417/360, 569, 454, 539, 437, 515, 417/571; 92/169.1, 146
  See application file for complete search history.

(56) References Cited

U.S. PATENT DOCUMENTS

| 3,114,326 | A |   | 12/1963 | Yaindl |
|---|---|---|---|---|
| 3,427,998 | A |   | 2/1969 | Redman |
| 3,801,234 | A | * | 4/1974 | Love et al. .................... 417/454 |
| 3,817,663 | A | * | 6/1974 | Zehner .......................... 417/569 |
| 3,849,032 | A | * | 11/1974 | Mulvey et al. ................ 417/454 |
| 3,870,439 | A |   | 3/1975 | Stachowiak et al. |
| 4,277,229 | A |   | 7/1981 | Pacht |
| 4,388,050 | A | * | 6/1983 | Schuller ........................ 417/454 |
| 4,432,386 | A |   | 2/1984 | Pacht |
| 4,551,077 | A | * | 11/1985 | Pacht ............................ 417/454 |
| 4,878,815 | A | * | 11/1989 | Stachowiak ................... 417/63 |
| 5,059,101 | A | * | 10/1991 | Valavaara ..................... 417/569 |
| 5,061,159 | A |   | 10/1991 | Pryor |
| 5,073,096 | A |   | 12/1991 | King et al. |
| 5,102,312 | A |   | 4/1992 | Harvey |
| 5,127,807 | A |   | 7/1992 | Eslinger |
| 5,171,136 | A | * | 12/1992 | Pacht ............................ 417/571 |
| 5,253,987 | A | * | 10/1993 | Harrison ....................... 417/566 |
| 5,299,921 | A |   | 4/1994 | Richter |
| 5,302,087 | A |   | 4/1994 | Pacht |
| 5,362,215 | A | * | 11/1994 | King ............................. 417/455 |
| 5,382,057 | A |   | 1/1995 | Richter |
| 5,823,093 | A |   | 10/1998 | Kugelev et al. |
| 5,924,853 | A |   | 7/1999 | Pacht |
| 6,171,070 | B1 | * | 1/2001 | Mitake ......................... 417/273 |
| 6,241,492 | B1 |   | 6/2001 | Pacht |
| 6,382,940 | B1 |   | 5/2002 | Blume |
| 6,419,459 | B1 | * | 7/2002 | Sibbing ........................ 417/360 |

(Continued)

OTHER PUBLICATIONS

Kemper Valve & Fittings, Flow Line Service and Stimulation Products, Issue Date Jul. 15, 2003.*

(Continued)

*Primary Examiner* — Devon Kramer
*Assistant Examiner* — Nathan Zollinger
(74) *Attorney, Agent, or Firm* — Patterson & Sheridan, LLP

(57) ABSTRACT

A modular fluid end for a multiplex plunger pump, each module machined from a single-piece steel forging with a plunger bore intersected by a linear suction/discharge bore and pumped fluid is discharged straight out through a top of the module into a discharge manifold made up using 1502 frac iron components. A compression clamp applies a crush load to opposed sides of the modules to extend service life.

19 Claims, 8 Drawing Sheets

U.S. PATENT DOCUMENTS

| | | | |
|---|---|---|---|
| 6,544,012 B1 | 4/2003 | Blume | |
| 7,114,928 B2 | 10/2006 | Asayama et al. | |
| 7,118,349 B2 | 10/2006 | Oglesby | |
| 7,335,002 B2* | 2/2008 | Vicars | 417/360 |
| 7,341,435 B2 | 3/2008 | Vicars | |
| 7,354,256 B1* | 4/2008 | Cummins | 417/515 |
| 7,404,704 B2* | 7/2008 | Kugelev et al. | 417/454 |
| 7,484,452 B2* | 2/2009 | Baxter et al. | 92/169.1 |
| 7,506,574 B2 | 3/2009 | Jensen et al. | |
| 7,524,173 B2* | 4/2009 | Cummins | 417/515 |
| 7,984,671 B2 | 7/2011 | Jensen et al. | |
| 2006/0002806 A1* | 1/2006 | Baxter et al. | 417/539 |
| 2008/0080992 A1 | 4/2008 | Cummins | |
| 2008/0193299 A1 | 8/2008 | Oglesby | |
| 2011/0052423 A1* | 3/2011 | Gambier et al. | 417/63 |
| 2011/0081268 A1* | 4/2011 | Ochoa et al. | 417/521 |

OTHER PUBLICATIONS

Halliburton Fluid Systems; H04798 04/06, © 2006; Cementing, HT-400 Pump, The Industry Standard.

* cited by examiner

COMPRESSION CLAMP FOR A MODULAR FLUID END FOR A MULTIPLEX PLUNGER PUMP

RELATED APPLICATIONS

This is the first application filed for this invention.

FIELD OF THE INVENTION

This invention relates in general to multiplex plunger pumps used to pump well stimulation fluids at high volumes and very high pressures and, in particular, to a modular fluid end for multiplex plunger pumps.

BACKGROUND OF THE INVENTION

Multiplex plunger pumps are commonly used in the oil and gas industry and are well known in the art. They have a fluid end and a power end that drives the fluid end. Multiplex plunger pumps used to pump well stimulation fluids generally have power ends rated at 2,000 horse power or more. The fluid ends of those pumps frequently have a service life of less than 200 hours because the well stimulation fluids are generally abrasive and/or corrosive and must often be pumped at rates of up to 100 bbl/minute and pressures of 10,000 psi or more.

Multiplex plunger pump fluid ends are either monoblock or modular constructions. Many improvements for extending the service life and/or facilitating the maintenance of both types have been invented. However, short service life and/or complex maintenance requirements persist.

There therefore exists a need for a fluid end for a multiplex plunger pump that is simpler and less costly to manufacture and maintain than other multiplex plunger pump fluid ends that are currently available.

SUMMARY OF THE INVENTION

It is therefore an object of the invention to provide a fluid end for a multiplex plunger pump that is simpler and less costly to manufacture and maintain.

The invention therefore provides a modular fluid end for a multiplex plunger pump, comprising: at least two fluid end modules arranged in a side-by-side relationship, each of the fluid end modules having a cylinder with a plunger bore that receives a plunger, an intake end and a discharge end with a linear suction/discharge bore through the intake end and the discharge end that intercepts the plunger bore, the discharge end being connected directly to a discharge manifold; and a compression clamp that is independent of the at least two fluid end modules, the compression clamp applying a crush load to opposite sides of respective outermost ones of the at least two fluid end modules.

The invention further provides a fluid end module for a multiplex plunger pump, comprising: a cylinder with a plunger bore, and a suction/discharge bore that intercepts the plunger bore at right angles and extends straight through an intake end on one side of the cylinder and a discharge end on the other side of the cylinder; a mounting plate on an inner end of the cylinder; and a crush load transfer boss on each side of the cylinder, the respective crush load transfer bosses being aligned with the interception of the plunger bore and the suction/discharge bore.

The invention yet further provides a method of constructing a discharge manifold for a modular multiplex pump, comprising: connecting a 1502 iron tee fitting to a discharge port of at least one module of the pump; connecting a 1502 iron cross fitting to a discharge port of at least one other module of the pump; and connecting the at least one tee fitting and the at least one cross fitting together to construct the discharge manifold.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a modular fluid end for a multiplex plunger pump. Each module is machined from a single-piece steel forging and has a plunger bore intersected by a linear suction/discharge bore, so pumped fluid is discharged straight out through a top of the module into a discharge manifold assembled from readily available "frac iron" (1502 iron) components. A compression clamp applies a crush load to opposite sides of the modules in the modular fluid end to reduce stress and increase service life. The fluid end modules are less expensive to construct than prior art monoblock or modular fluid ends because material use is reduced; machining is significantly simplified and can be accomplished using only a lathe; and, the discharge manifold is made up using readily available stock. Furthermore, many existing power ends for multiplex plunger pumps may be retrofitted with at most minor modifications to accept the modular fluid end in accordance with the invention.

Figure 1:
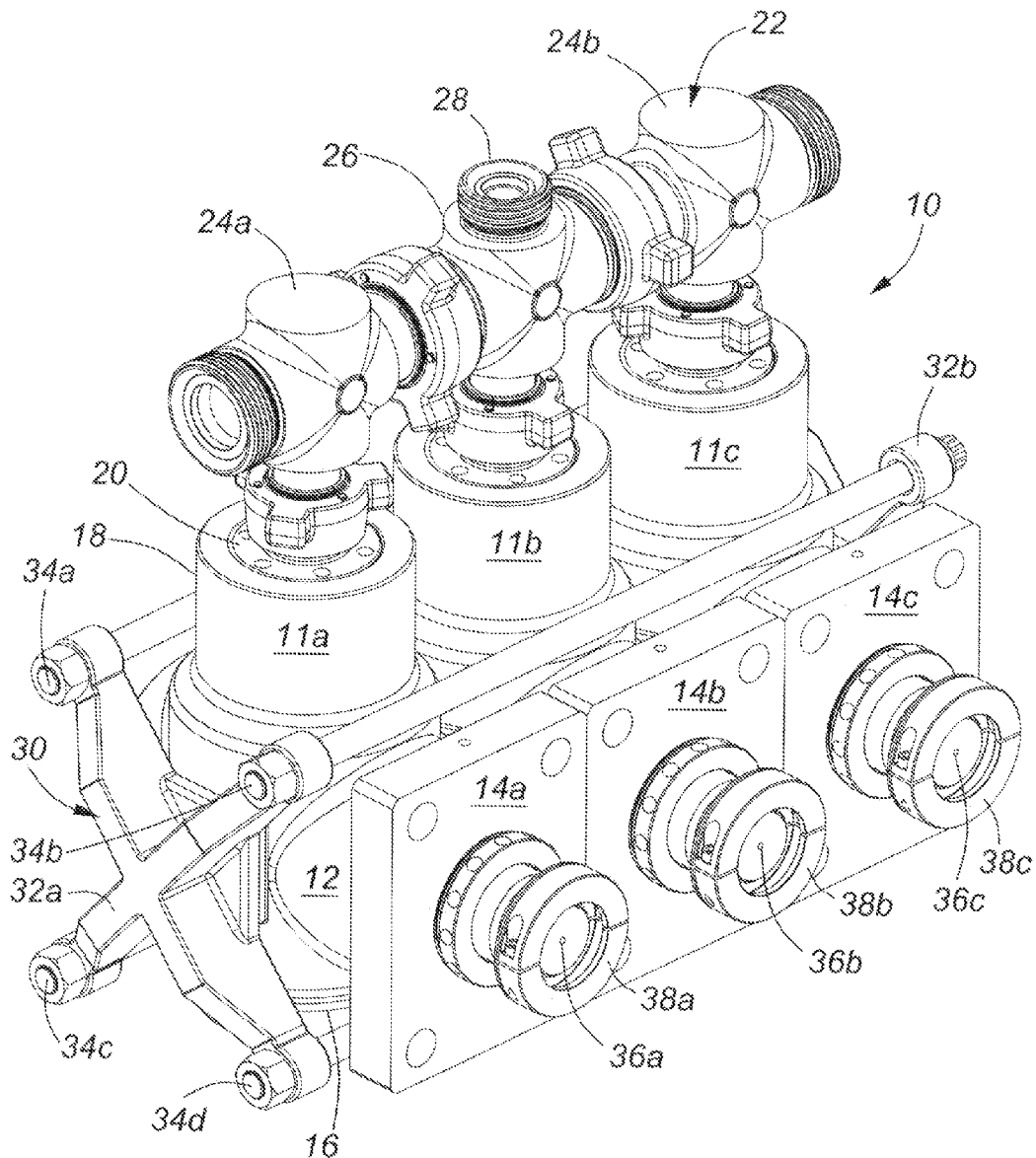
FIG. 1 is a rear perspective view of a triplex fluid end in accordance with one embodiment of the invention.

FIG. 1 is a rear perspective view of a fluid end 10 in accordance with one embodiment of the invention. In this embodiment the fluid end 10 is for a triplex plunger pump having a power end (not shown) that drives three pump plungers in a mariner well known in the art. The fluid end 10 includes three fluid end modules 11a, 11b and 11c, arranged in a side-by-side relationship. The construction of the fluid end modules, hereinafter referred to simply as fluid end modules 11, will be explained below with reference to FIGS. 7 and B. The fluid end modules 11a, 11b and 11c are identical and interchangeable. As will be understood by those skilled in the art, a fluid end for a multiplex plunger pump is not limited to the triplex configuration shown.

Each fluid end module 11 is forged from a single piece of high tensile strength steel. In one embodiment the steel is AISI 4340 steel that is heat treated to a yield strength (ys) of at least 110 ksi. The machining required on the forged module is readily accomplished on a lathe rather than a milling machine, which conserves both time and expense.

Each fluid end module 11 has a cylinder 12 that terminates on a rear end in a mounting plate 14 (e.g. 14a, 14b, 14c) used to mount the fluid end module 11 to the multiplex plunger pump power end. Each fluid end module 11 further includes an intake (suction) end 16 to which a suction manifold (not shown) is connected, and a discharge end 18 having a threaded discharge bore that receives a discharge cover nut 20 to which a discharge manifold 22 is directly connected. As noted above, the discharge manifold 22 is assembled from 1502 frac iron fittings that are commercially available and well known in the art. In one embodiment the discharge manifold 22 is constructed from 1502 frac iron tee bodies 24a, 24b and a 1502 frac iron cross body 26. The cross body 26 has a top port 28 with a pin thread adapted to support the connection of a pressure valve (not shown) in a manner well known in the art, to provide a dynamic reading of a fluid discharge pressure of the fluid end 10.

The respective fluid end modules 11 are clamped together by a compression clamp 30 that is independent of the respective fluid end modules 11 and applies a predetermined crush load to opposite sides of the outermost ones of the fluid end modules 11, e.g. fluid end modules 11a and 11c. The crush load thus applied is distributed though contact to each of the fluid end modules 11, and reduces stress on the respective fluid end modules 11 to lengthen their service life. In this embodiment, the compression clamp 30 includes two compression clamp plates 32a, 32b, which are "spider plates" drawn together by four compression clamp fasteners 34 (34a-34d). In one embodiment, the spider plates 32a, 32b are AISI 4340 cast steel heat treated to a yield strength (ys) of 130 ksi. In one embodiment, the compression clamp fasteners 34 are Maxbolt™ Load Indicating Fasteners available from Valley Forge & Bolt. Manufacturing Company in Phoenix, Ariz., U.S.A. Each compression clamp fastener 34 has a 120 ksi proof strength and is tightened to 90%-100% fastener tension, so that the compression clamp 30 applies about 360,000 lb of crush load to fluid end modules 11.

As will be explained below in detail with reference to FIG. 7, each fluid end module 11 has a plunger bore through its cylinder 12 that receives a respective plunger 36a-36c. Each plunger is connected to a plunger drive (not shown) of the power end by a respective plunger clamp 38a-38c.

Figure 2:
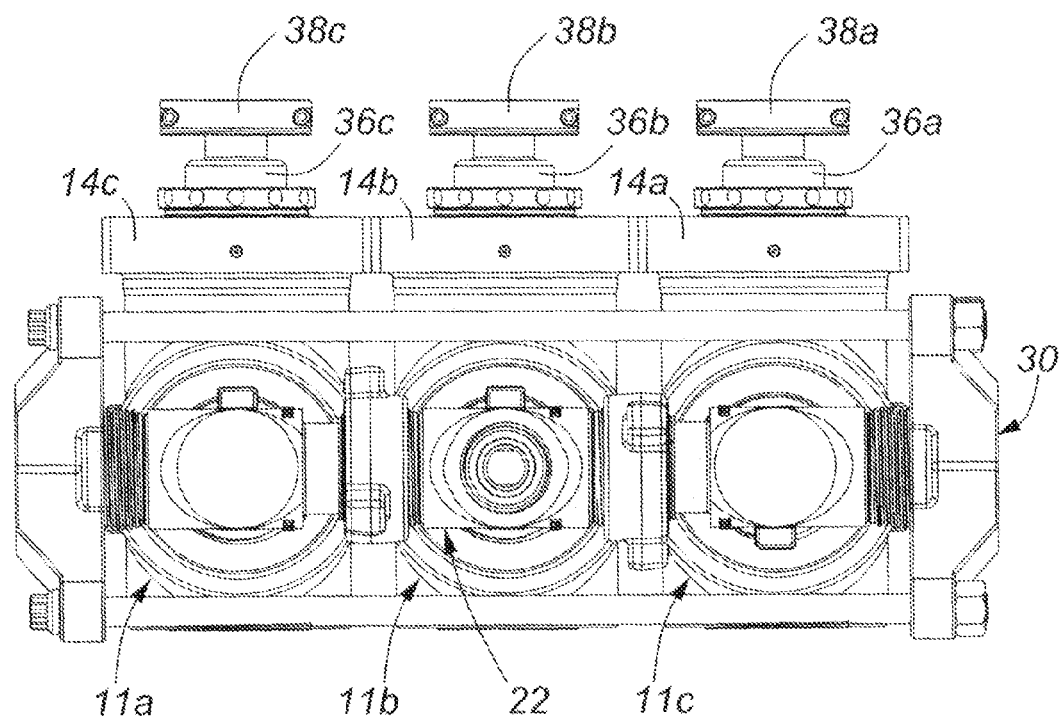
FIG. 2 is a top plan view of the fluid end shown in FIG. 1.

FIG. 2 is a top plan view of the fluid end shown in FIG. 1. As can be seen, the only points of contact between the fluid end modules 11 is along mating edges of the mounting plates 14a-14c, and at crush load transfer bosses 40 (see FIG. 3) forged on opposite sides of the respective fluid end modules 11a, 11b and 11c. The crush load transfer bosses 40 are respectively aligned with an intersection of the plunger bore that receives the plunger 36 and a linear suction/discharge bore that extends through the intake end 16 and the discharge end 18 and intersects the plunger bore at a right angle.

Figure 3:
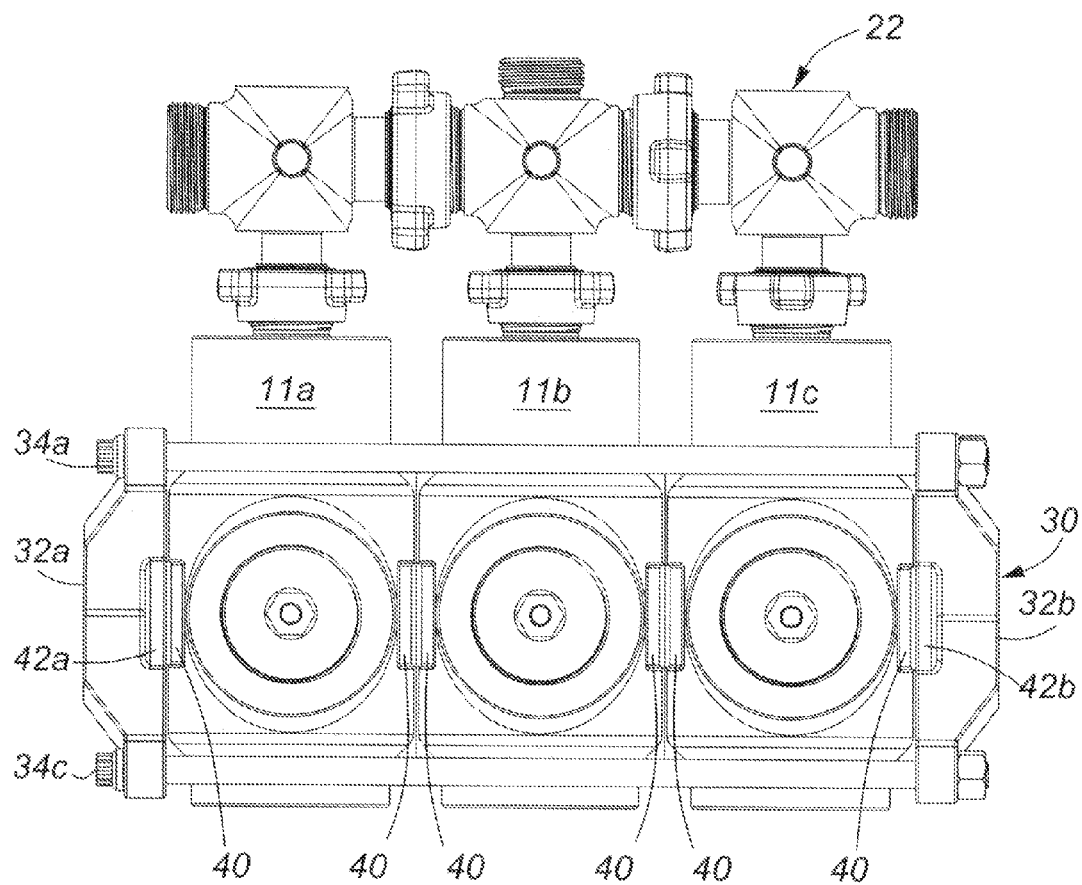
FIG. 3 is a front elevational view of the fluid end shown in FIG. 1.

FIG. 3 is a front elevational view of the fluid end shown in FIG. 1. As explained above, the crush load transfer bosses 40 forged on opposite sides of the respective fluid end modules 11 transfer the crush load applied by crush load plate bosses 42a, 42b of the compression clamp 30. In one embodiment the respective crush load transfer bosses 40 are rectangular and have substantially planar outer surfaces that measure about 5" by 5.75", and the crush load plate bosses 42a, 42b are about the same size. However, it should be understood that the size and shape of the crush load transfer bosses 40 and the crush load plate bosses 42 is, within readily understood limits, a matter of design choice.

Figure 4:
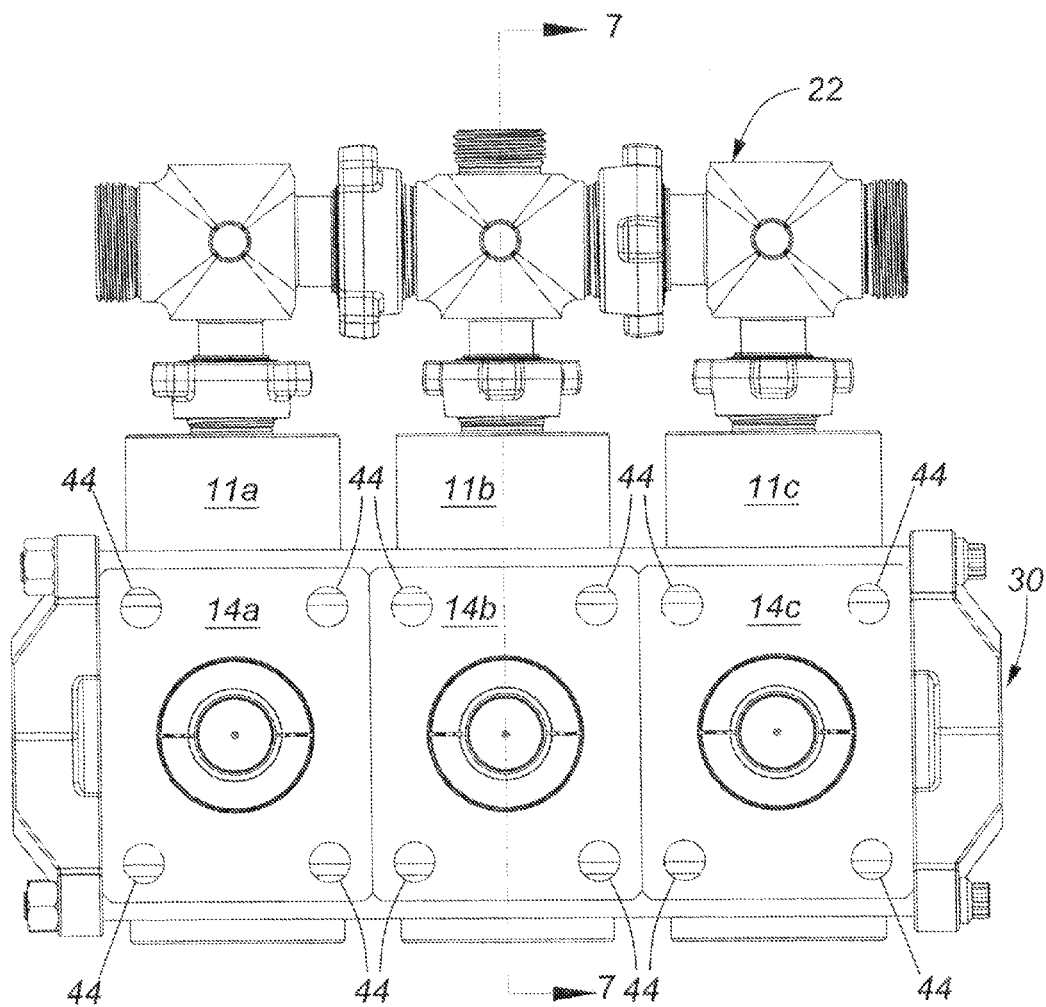
FIG. 4 is a rear elevational view of the fluid end shown in FIG. 1.

FIG. 4 is a rear elevational view of the fluid end shown in FIG. 1. Each mounting plate 14a-14c includes a plurality of mounting bores 44 that receive threaded fasteners used to mount the respective fluid end modules 11a, 11b and 11c to a power end of a multiplex plunger pump. In this embodiment, each fluid end module has four mounting bores 44. However, the number and the position of the mounting bores 44 is a matter of design choice and may be dictated by the construction of the power end to which the fluid end module 11 is to be mounted.

Figure 5:
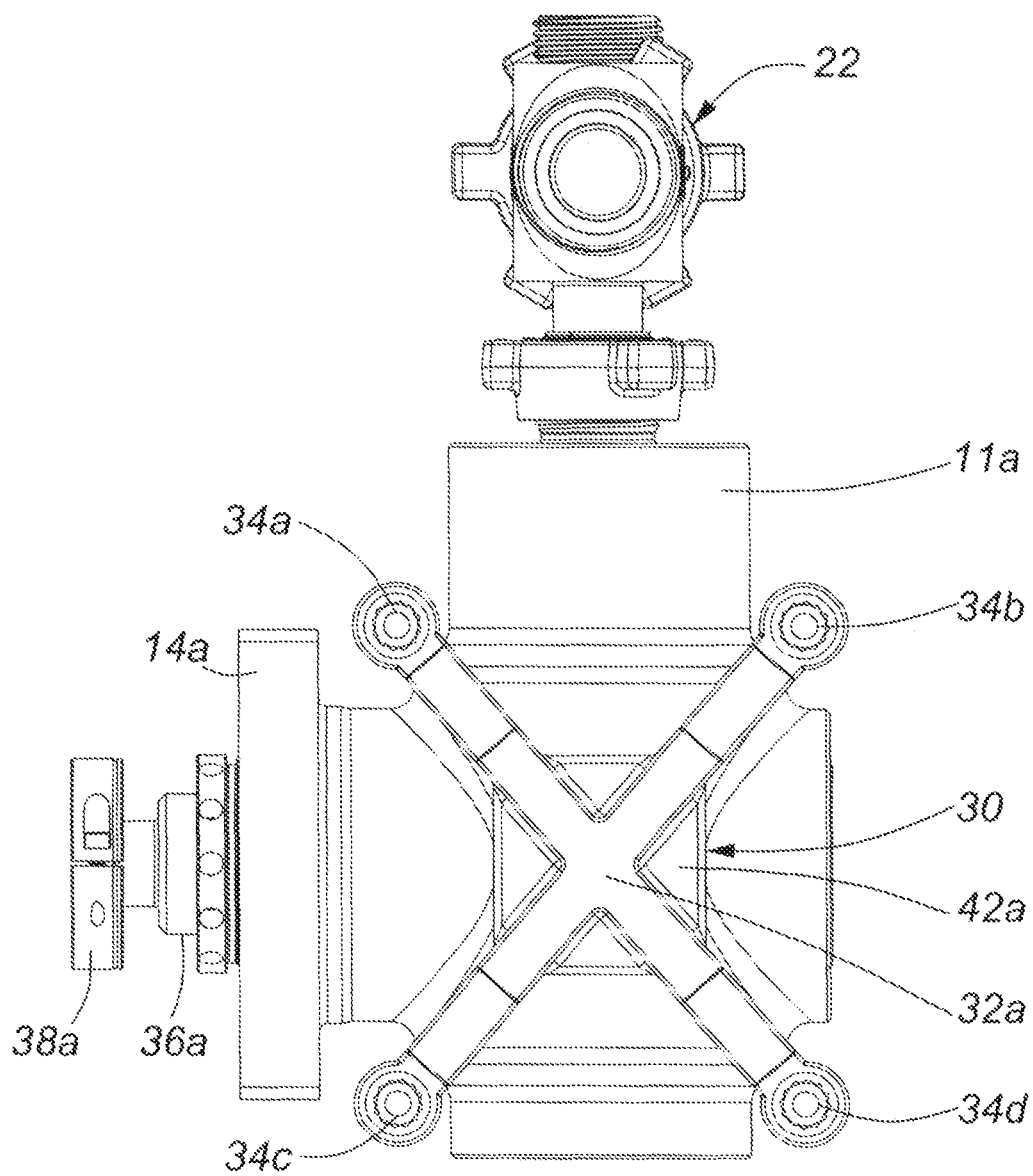
FIG. 5 is an end elevational view of the fluid end shown in FIG. 1.

FIG. 5 is an end elevational view of the fluid end shown in FIG. 1. As can be seen in FIGS. 1-5, the only points of contact between the compression clamp 30 and the fluid end modules 11 are between the crush load plate boss 42a and the corresponding crush load transfer boss 40 on the fluid end module 11a, and the crush load plate boss 42b and the corresponding crush load transfer boss 40 on the fluid end module 11c. The crush load fasteners 34a-34d do not contact the respective fluid end modules 11a-11c.

Figure 6:
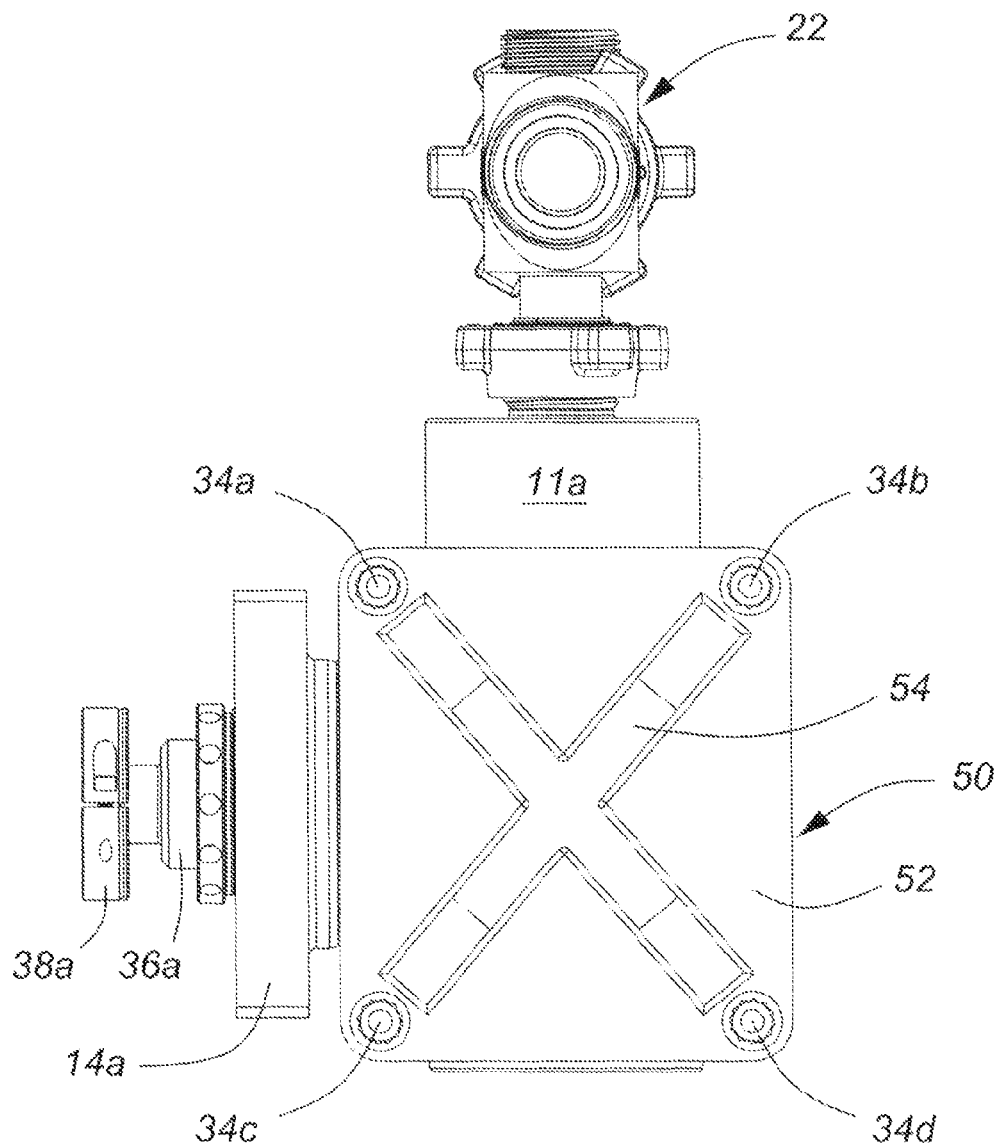
FIG. 6 is an end elevational view of an alternate embodiment of the fluid end in accordance with the invention.

FIG. 6 is an end devotional view of an alternate embodiment of the fluid end in accordance with the invention. This embodiment of the invention is identical to the embodiment described with reference to FIGS. 1-5 except that a compression clamp 50 has rectangular compression clamp plates 52 with an X-shaped reinforcing rib 54. In one embodiment the reinforcing rib 54 is welded to the compression clamp plate 52, and both the compression clamp plate 52 and the reinforcing rib 54 are AISI 4330 steel that is heat treated to a yield strength (ys) of about 130 ksi. As will be understood by those skilled in the art, the shape and configuration of the compression clamps 30, 50 is a matter of design choice and is immaterial provided that a compression clamp can apply an adequate crush load to the crush load transfer bosses 40 of fluid end modules 11.

Figure 7:
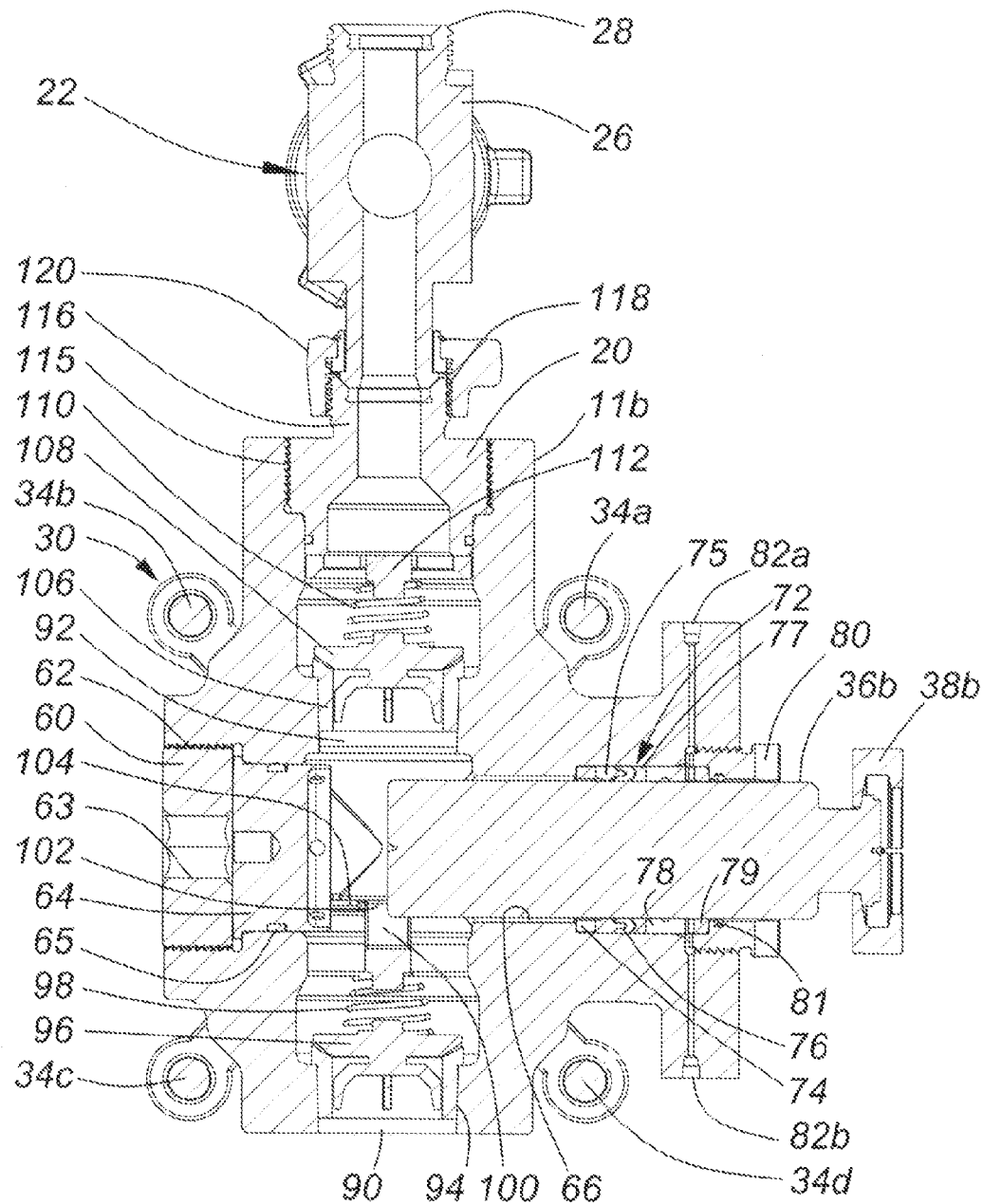
FIG. 7 is a cross-sectional view of a fluid end module in accordance with the invention, taken along line 7-7 shown in FIG. 4.

FIG. 7 is a cross-sectional view of the fluid end module 11 in accordance with the invention, taken along line 7-7 shown in FIG. 4. A plunger bore cover nut 60 threadedly engages a plunger bore cover nut thread 62. A hexagonal socket 63 in the plunger bore cover nut 60 accepts a key (not shown) that is used to disengage the plunger bore cover nut 60 from the plunger bore cover nut thread 62 to provide access to a plunger bore cover 64, the removal of which permits inspection and maintenance of plunger 36b and suction/discharge valve components described below.

A peripheral groove in the plunger bore cover 64 receives a fluid seal 65 that seals an outer end of a plunger bore 66. The opposite end of the plunger bore 68 receives the plunger 36b, which is reciprocated in the plunger bore 66 to pump fluids through the fluid end module 11 in a manner known in the art. As explained above, the plunger 36b is connected to a reciprocating drive (not shown) of the power end by the plunger clamp 38b. The plunger end of the plunger bore 66 is sealed by packing in a stuffing box 72. In one embodiment, the packing includes: a packing junk ring 74; a packing header ring 75; a packing pressure ring 76; a packing top adapter 77; a packing bushing 78 and, a packing lantern ring 79. A packing nut or gland 80 compresses the packing around an outer periphery of the plunger 36b to provide a high-pressure seal. A packing wiper seal 81 received in a peripheral groove in the packing nut 80 seals the stuffing box 72. Lubrication ports 82a, 82b permit lubricant (not shown) to be pumped through the packing lantern ring 79 into the stuffing box 72, as required.

A suction bore 90 is axially aligned with a discharge bore 92. A suction valve seat 94 is frictionally retained in the suction bore 90. A suction valve 96 is urged onto the suction valve seat 94 by a spiral suction valve spring 98. A top end of the suction valve spring is captured on a nipple of a suction valve stop 100. A top end of the suction valve stop 100 has suction valve stop wings 102 (see FIG. 8) that are received in a suction valve stop groove 104. The plunger bore cover 64 retains the suction valve stop winos 102 in the suction valve stop groove.

A discharge valve seat 106 is frictionally retained in the discharge bore 92. A discharge valve 108 is urged onto the discharge valve seat 106 by a spiral discharge valve spring 110. A top end of the discharge valve spring is captured on a nipple of a discharge valve stop 112. The discharge valve stop 112 is retained in the discharge bore 106 by a discharge cover nut 20 that engages a discharge cover nut box thread 115 in the discharge bore 92. The discharge cover nut 20 has a protruding axial neck 116 with a pin thread 118 engaged by a wing nut 120 of the 1502 frac iron cross body 26 used to make up the discharge manifold 22.

Figure 8:
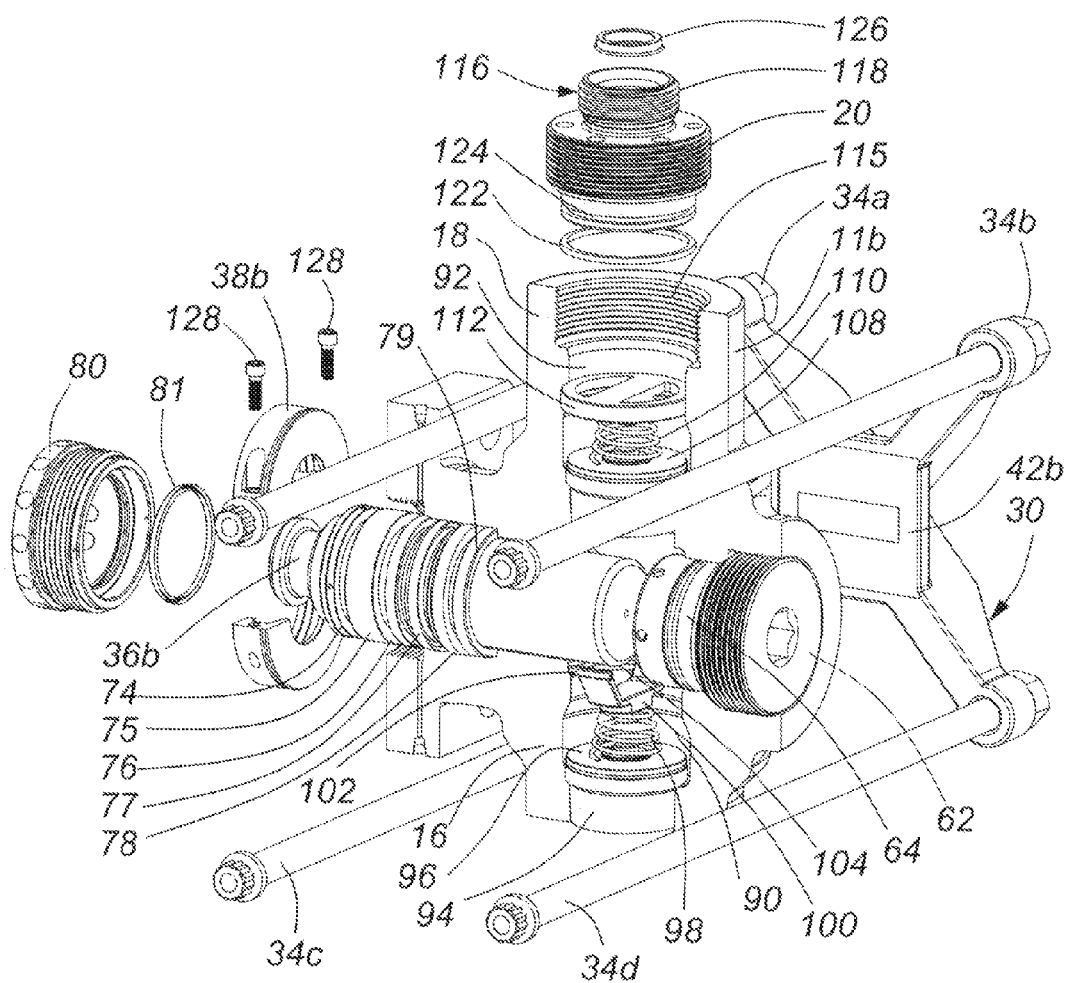
FIG. 8 is a cross-sectional exploded view of a fluid end module shown in FIG. 7.

FIG. 8 is a cross-sectional exploded view of the fluid end module shown in FIG. 7. Most of the valve components shown in FIG. 8 have been explained above with reference to FIG. 7 and that description will not be repeated. Pumped fluid is inhibited from leaking around the discharge cover nut 20 by a discharge cover nut seal 122 received in a discharge cover nut seal groove 124. Pumped fluid is inhibited from leaking around between the 1502 frac iron cross body 26 and the discharge cover nut by a seal ring 126 received in a top of the protruding axial neck 116. The plunger clamp 38b is a two-piece clamp held together by cap screws 128.

As we understood by those skilled in the art, in operation the plungers 36 are reciprocated in the plunger bores 66 by a multiplex pump power end so they travel through a suction stroke as the plunger 36 is drawn away from the plunger bore cover 64 and a discharge stroke as the plunger 36 is pushed into the plunger bore cover 64. On the suction stroke the discharge valve 108 is pulled closed and the suction valve 96 is drawn by suction away from the suction valve seat 94. Fluid flows up through the suction bore 90 from a suction manifold (not shown) and into the plunger bore 66. On the discharge stroke, the suction valve 96 is forced down onto the suction valve seat 94 and the discharge valve 108 is forced open as the fluid drawn into the plunger bore 66 on the suction stroke is discharged into the discharge manifold 22 on the discharge stroke.

if any one of the fluid end modules 11 fails during operation, it can be quickly replaced by removing the compression clamp 30, 50 and disconnecting the fluid end module 11 from the power end by removing fasteners from the mounting bores 44 and the plunger clamp 38. A new or refurbished fluid end module 11 is then mounted to the power end by reversing this process. Consequently, a mechanical failure in one fluid end module does not necessitate replacement of the entire fluid end, as in the case of monoblock fluid ends.

The embodiments of the invention described above are intended to be exemplary only, and not a complete description of every possible configuration of the fluid end modules 11, compression clamps 30, 50 or the discharge manifold 22. The scope of the invention is therefore intended to be limited solely by the scope of the appended claims.

We claim:

1. A modular fluid end for a multiplex plunger pump, comprising:
    at least two fluid end modules arranged in a side-by-side relationship, each of the fluid end modules having a cylinder with a plunger bore that receives a plunger, an intake end and a discharge end with a linear suction/discharge bore through the intake end and the discharge end and that intercepts the plunger bore, the discharge end being connected directly to a discharge manifold; and
    a compression clamp comprising two compression plates and compression clamp fasteners that interconnect the two compression plates wherein the compression clamp is entirely disposed external to the at least two fluid end modules, the compression clamp applying a crush load to opposite sides of respective outermost ones of the at least two fluid end modules.

2. The fluid end as claimed in claim 1 wherein the compression clamp fasteners do not contact the at least two fluid end modules.

3. The fluid end as claimed in claim 2 wherein the compression clamp comprises four compression clamp fasteners.

4. The fluid end as claimed in claim 2 wherein the compression clamp fasteners are torqued to a predetermined tension to apply the crush load.

5. The fluid end as claimed in claim 1 wherein the fluid end modules further comprise a crush load transfer boss on each side of the cylinder of the respective fluid end modules.

6. The fluid end as claimed in claim 5 wherein the crush load transfer bosses are aligned with the interception of the plunger bore and the suction/discharge bore.

7. The fluid end as claimed in claim 1 wherein the discharge end comprises a discharge cover nut with a protruding axial neck that has a pin thread to which the discharge manifold is connected.

8. The fluid end as claimed in claim 7 wherein the discharge manifold comprises a 1502 iron fitting connected to each of the fluid end modules, adjacent ones of the 1502 iron fittings being connected together.

9. The fluid end as claimed in claim 8 wherein one of the 1502 iron fittings is a cross fitting having a top port adapted to support the connection of a pressure valve.

10. The fluid end as claimed in claim 1 further comprising a mounting plate forged on an end of the cylinder.

11. The fluid end as claimed in claim 10 wherein the mounting plate comprises fluid end module mounting bores.

12. A fluid end module for a multiplex plunger pump, comprising:
    at least two cylinders, each cylinder having a plunger bore and a suction/discharge bore that intercepts the plunger bore at right angles and extends straight through an intake end on one side of each cylinder and a discharge end on the other side of each cylinder;
    a mounting plate on an inner end of each cylinder;
    a crush load transfer boss on each cylinder, the respective crush load transfer bosses being aligned with the interception of the plunger bore and the suction/discharge bore; and
    a compression clamp comprising two compression plates and compression clamp fasteners that interconnect the two compression plates wherein the compression clamp is entirely disposed external to the at least two cylinders, the compression clamp applying a crush load to opposite sides of respective outermost ones of the at least two cylinders.

13. The fluid end module as claimed in claim 12 wherein each cylinder comprises a single-piece steel forging.

14. The fluid end module as claimed in claim 12 wherein the discharge end comprises a box thread that retains a discharge cover nut having a protruding axial neck with a pin thread.

15. The fluid end module as claimed in claim 14 wherein the protruding axial neck of the discharge cover nut supports the connection of a 1502 iron fitting to assemble a discharge manifold for the Multiplex plunger pump.

16. The fluid end module as claimed in claim 14 wherein the discharge cover nut retains a discharge valve stop in the suction/discharge bore above the plunger bore.

17. The fluid end module as claimed in claim 12 further comprising a plunger bore cover nut that retains a plunger bore cover in an outer end of the plunger bore.

18. The fluid end module as claimed in claim 17 wherein the plunger bore cover retains wings of a suction valve stop in a suction valve groove located in the suction/discharge bore below the plunger bore.

19. The fluid end module as claimed in claim 12 wherein the compression clamp fasteners do not contact the at least two cylinders.

* * * * *